(12) United States Patent
Litvin et al.

(10) Patent No.: US 7,191,521 B2
(45) Date of Patent: Mar. 20, 2007

(54) ADVANCED GEOMETRY OF SKEW AND STRAIGHT BEVEL GEARS PRODUCED BY FORGING

(75) Inventors: Faydor L. Litvin, Skokie, IL (US); Xiangshun Zhao, Farmington, MI (US); John Sofia, Birmingham, MI (US); Theresa Barrett, Leonard, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 10/360,290

(22) Filed: Feb. 7, 2003

(65) Prior Publication Data

US 2004/0154423 A1   Aug. 12, 2004

(51) Int. Cl.
 *F16H 55/08* (2006.01)
(52) U.S. Cl. .................... 29/893.3; 74/457; 74/462
(58) Field of Classification Search ........... 74/457, 74/458, 459.5, 460, 462, DIG. 12; 29/893, 29/893.3, 893.34; 72/354.2, 360
See application file for complete search history.

(56) References Cited

U.S. PATENT DOCUMENTS

| | | | | |
|---|---|---|---|---|
| 1,454,508 | A | * | 5/1923 | Eckert .......................... 74/434 |
| 1,694,028 | A | * | 12/1928 | Wildhaber .................. 74/459.5 |
| 4,651,588 | A | * | 3/1987 | Rouverol ...................... 74/462 |
| 4,761,867 | A | * | 8/1988 | Vollmer et al. ............ 29/893.3 |
| 4,867,002 | A | | 9/1989 | Bouchet |
| 4,899,609 | A | * | 2/1990 | Nagata ......................... 74/462 |
| 5,083,474 | A | * | 1/1992 | Rouverol ...................... 74/461 |
| 5,116,173 | A | | 5/1992 | Goldrich |
| 5,271,289 | A | * | 12/1993 | Baxter, Jr. .................... 74/462 |
| 5,341,699 | A | * | 8/1994 | Rouverol ...................... 74/462 |
| 5,485,761 | A | * | 1/1996 | Rouverol ...................... 74/462 |
| 5,537,889 | A | * | 7/1996 | Shigeura et al. ............. 74/464 |
| 5,802,921 | A | * | 9/1998 | Rouverol ...................... 74/458 |
| 5,823,857 | A | * | 10/1998 | Tan .............................. 451/47 |
| 5,845,533 | A | | 12/1998 | Basstein et al. |
| 6,080,199 | A | | 6/2000 | Umeyama et al. |
| 6,101,892 | A | | 8/2000 | Berlinger, Jr. et al. |
| 6,128,969 | A | * | 10/2000 | Litvin et al. ................. 74/458 |
| 6,178,801 | B1 | * | 1/2001 | Ishida ....................... 72/354.2 |
| 6,205,879 | B1 | * | 3/2001 | Litvin et al. ................. 74/457 |
| 6,315,841 | B1 | * | 11/2001 | Fisher et al. ................ 148/328 |

FOREIGN PATENT DOCUMENTS

WO   WO 00-30795   6/2000

* cited by examiner

*Primary Examiner*—William C. Joyce
(74) *Attorney, Agent, or Firm*—Harness, Dickey & Pierce, P.L.C.

(57) ABSTRACT

The present invention provides for bevel gears having a localized and stable bearing contact. The localization of bearing contact is achieved by substitution of flat tooth surfaces with parabolic tooth surfaces. This is accomplished by either modifying line-contact directly or by using a generating parabolic cylinder during generation of the tooth surfaces. The actual contact area is spread over an ellipse centered around an instantaneous theoretical point of contact at the apex of the parabolic tooth surface. This localized bearing contact reduces the shift of the bearing due to assembly and manufacturing errors, thereby providing a more durable and quieter gear. Furthermore, the geometry of the gear enables creation of dies from which the gear may be forged. Transmission errors are modeled using a pre-designed parabolic function that coincides with the parabolic tooth surface design of the present invention.

3 Claims, 12 Drawing Sheets

Crown Gear Fillet

Cone Fillet

Plane

US 7,191,521 B2

ADVANCED GEOMETRY OF SKEW AND STRAIGHT BEVEL GEARS PRODUCED BY FORGING

FIELD OF THE INVENTION

The present invention relates to the design of the geometry for skew and straight bevel gears produced by forging.

BACKGROUND OF THE INVENTION

In the past, skew and straight bevel gears have been designed to have line-contact between a gear and pinion. Here, the individual teeth of the gear and pinion interact with one another along lines of contact that shift along the face of the teeth as the gear and pinion rotate. However, errors in assembly or manufacturing, such as misalignment of the gear and pinion, can lead to the area of contact being transferred to the edges of the teeth. A transmission function $\phi_2(\phi_1)$ of misaligned prior art gears is illustrated in FIG. 1. Angles $\phi_1$ and $\phi_2$ of transmission function $\phi_2(\phi_1)$ represent angles of rotation of a prior art gear and pinion. Function $\phi_2(\phi_1)$ exists as a sum of a linear function and a discontinuous almost linear function of transmission errors caused by errors of alignment. See "Gear Geometry and Applied Theory," by F. L. Litvin, Prentice Hall (1994). Such transmission errors cause large acceleration when one pair of teeth is changed for another, resulting in inevitable vibration and noise of the gear drives.

Moreover, many of the existing skew and bevel gears are designed to be produced by cutting. The manufacture of gears produced by cutting is undesirable for at least two reasons. First, cutting the tooth surface does not guarantee reduction of noise and good bearing contact. Second, due to wear on the cutting tool, consistency between gear sets is difficult to obtain. As an alternative to cutting, forging of gears is preferred.

Forging is preferred over cutting because it allows the optimal geometry of gears to be chosen so as to improve bearing contact and reduce transmission errors. The optimal geometry can be easily obtained through the use of the proper dies. Application of the proper die geometry provides a localized bearing contact and a parabolic function of transmission errors. Such a parabolic function of transmission errors is able to absorb the linear function of transmission errors caused by misalignment and avoids the noise and vibration caused by misalignment. See "Gear Geometry and Applied Theory," by F. L. Litvin, Prentice Hall (1994).

SUMMARY OF THE INVENTION

The present invention provides a geometry for skew and straight bevel gears produced by forging having a localized and stable bearing contact between tooth surfaces and a function of transmission errors having a favorable shape. The localized bearing contact of the pinion-gear tooth surface is located in the central part of the tooth surfaces. Localization of the bearing contact may be achieved in two ways.

Localization of the bearing contact may be achieved through modification of the lines of contact of one of the mating gears, either the pinion or the gear, so that they correspond to the meshing of the mating gear with the crown gear. Modification of the lines of contact is achieved by the parabolic deviation of the theoretical line of contact so that the localized bearing contact is orientated across the tooth surface and located in the central part of the tooth surface.

In the second approach, localization of the bearing contact is achieved using two generating surfaces of an imaginary crown gear to separately generate the pinion and gear tooth surfaces. The generating surfaces represent a plane and a parabolic cylinder. The actual contact area between the teeth is spread over an ellipse centered around an instantaneous theoretical point of contact. This localized bearing contact reduces the shifting of the bearing area to the edges of the tooth surface due to assembly and manufacturing errors, such as misalignment, thereby producing a more durable and more quiet gear. Further, the geometry of the gear is sufficiently simple such that dies used for forging may be easily produced.

The sensitivity of bevel gears with the proposed geometry is reduced due to the use of a pre-designed parabolic function of transmission errors. The function is able to absorb the almost linear functions of transmission errors caused by misalignment. See "Gear Geometry and Applied Theory," by F. L. Litvin, Prentice Hall (1994). The transmission function of the gear drive is provided by application of a nonlinear function that relates the angles of rotation of the bevel gear to the crown gear wherein meshing of the gear is performed. The transmission function is an algebraic sum of linear and parabolic functions.

Producing skew and straight bevel gears by forging using Applicants' geometry will not result in increased production costs when compared to production costs associated with using the existing geometry. The cost will not be affected because forging is based on the application of inexpensive dies and because the die surfaces are generated point by point. Therefore, the generation of dies of the new geometry does not present additional production difficulties.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

The terms "bevel" and "crown" are interchangeably used in the disclosure and appended claims. Accordingly, it will be appreciated for purposes of this disclosure that a "bevel gear" is a "crown gear" (and vice versa) and that a "crown gear" is not to be considered a specific subset or type of "bevel gear".

The mathematical generation of gear and pinion tooth surfaces is achieved using an imaginary crown gear that is in mesh with the pinion and gear tooth surfaces. The geometry of the pinion and gear tooth surfaces is generated as envelopes to a generating plane on the imaginary crown gear. This mathematical generation of the tooth surfaces is preferably done with a computer simulation using the method described herein.

Figure 1:
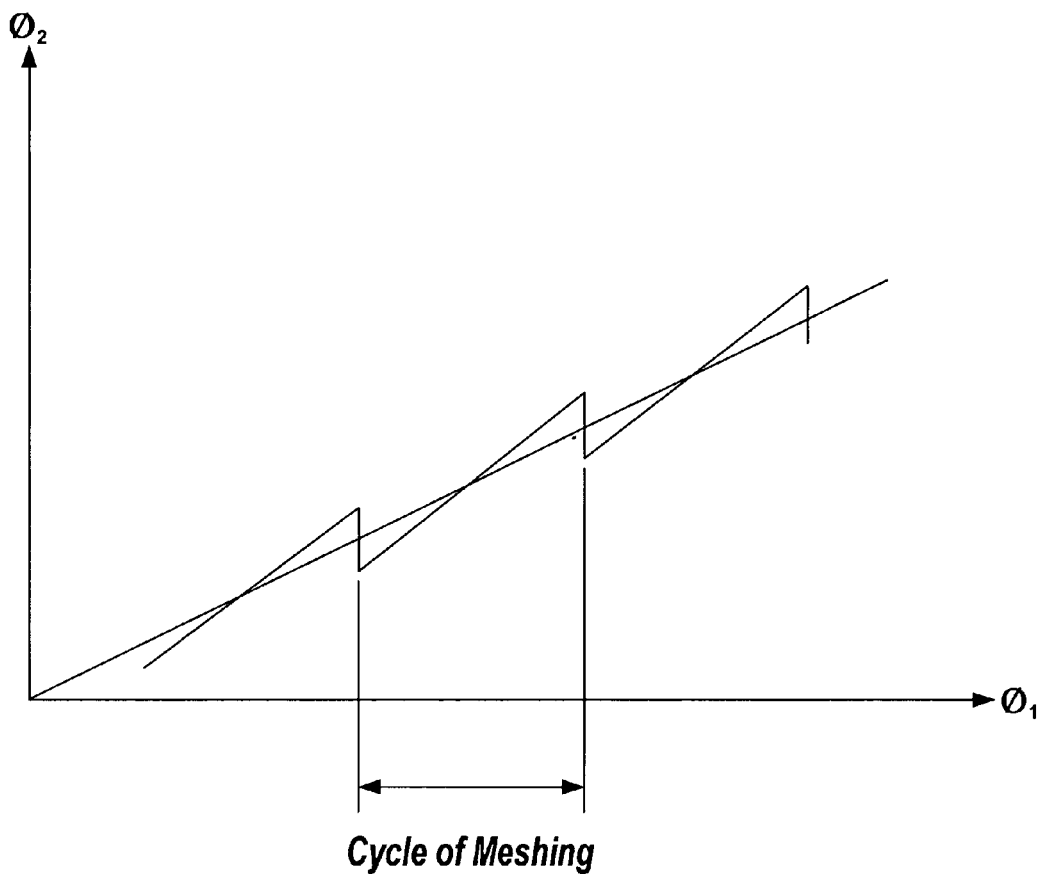
FIG. 1 is a graphical illustration of transmission function $\phi_2(\phi_1)$ produced by the prior art gear geometry.
Figure 2A:
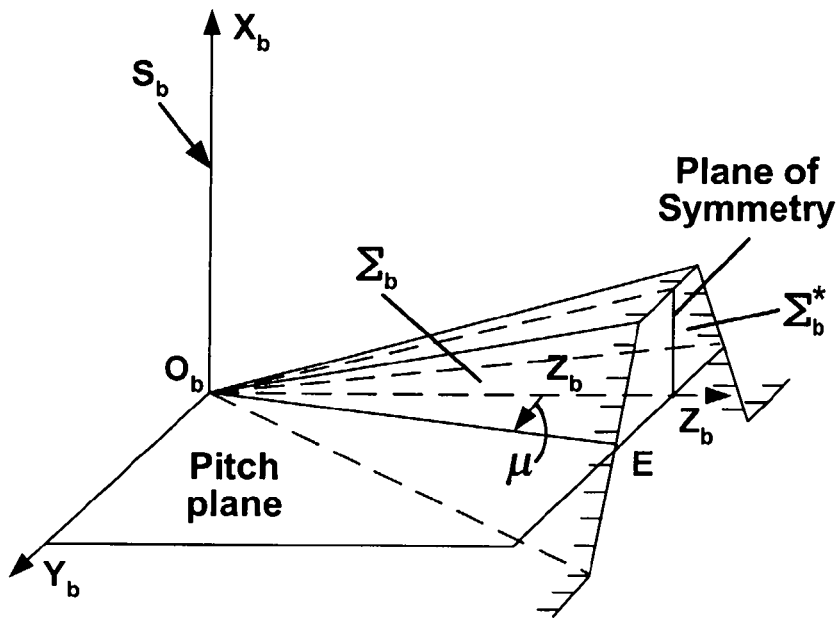
FIG. 2(a) is a graphical illustration of the generating space and planes of an imaginary crown gear generated in coordinate system $S_b(x_b,y_b,z_b)$ in accordance with the present invention.
Figure 2B:
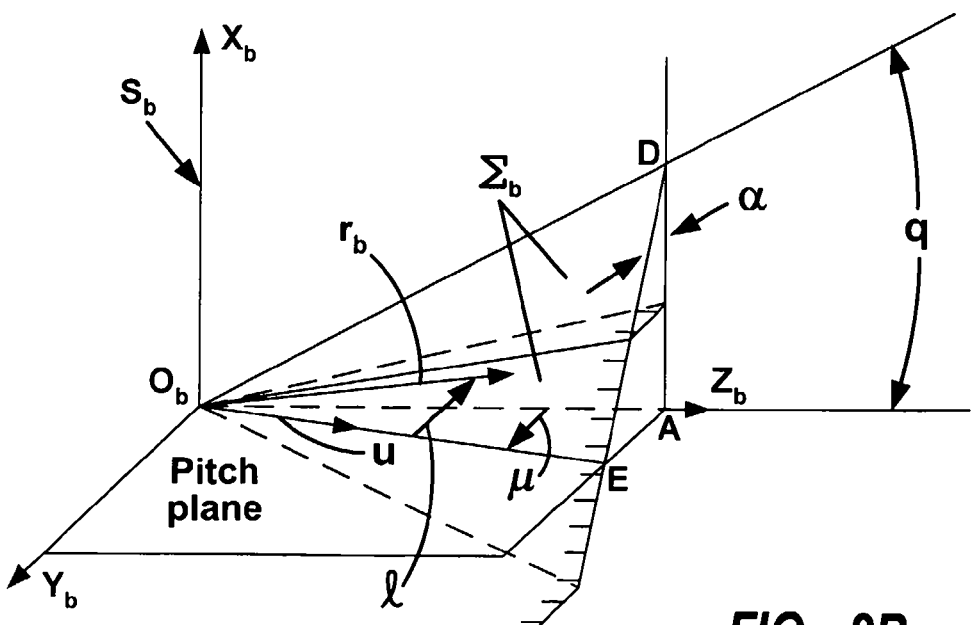
FIG. 2(b) is a graphical illustration of the formation of the generating space and planes of an imaginary crown gear generated in coordinate system $S_b(x_b,y_b,z_b)$ in accordance with the present invention.

Referring now to the drawing figures, the imaginary crown gear is shown in FIG. 2(a). The imaginary crown gear is formed by two generating planes that are conjugated to the respective tooth sides of the pinion and the gear. The generating planes $\Sigma_b$ and $\Sigma_b^*$ are represented in auxiliary coordinate system $S_b$ defined by axes $X_b$-$Y_b$-$Z_b$. Each of the generating planes are formed by two straight lines. For example, generating plane $\Sigma_b$ is formed by lines $O_bD$ and $O_bE$, as shown in FIG. 2(b). Parameter $2\mu$ represents the width of the space in the pitch plane, parameter $\alpha$ is the pressure angle, and auxiliary parameter q is determined by the formula $$\tan q = \sin \mu \cot \alpha \quad (1)$$

Figure 3:
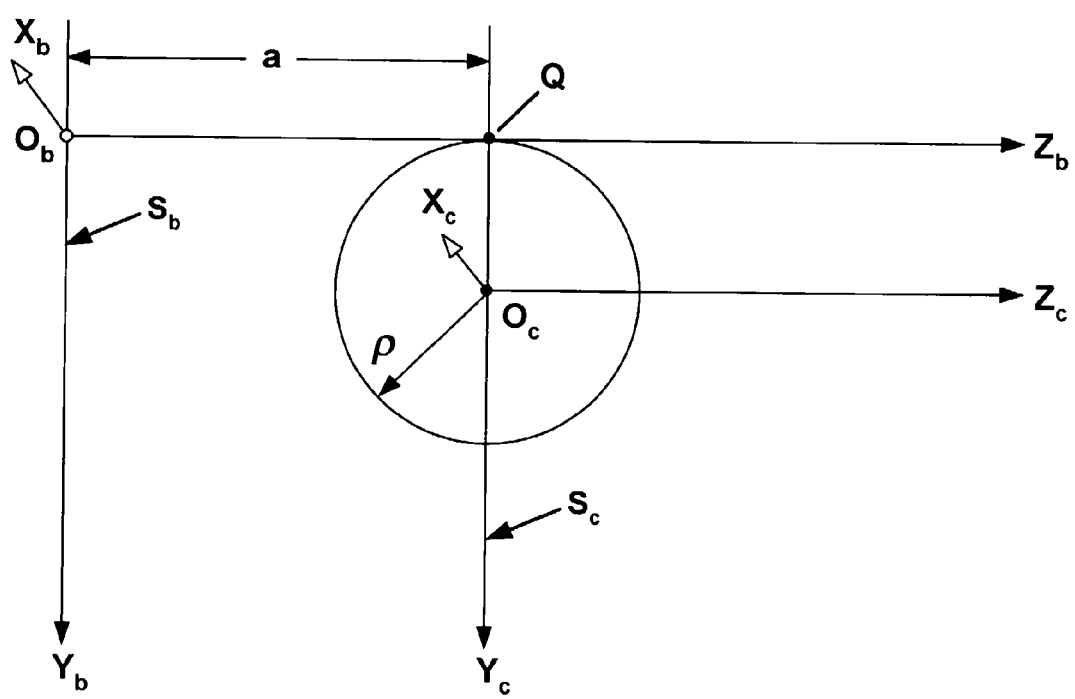
FIG. 3 shows the installation of coordinate system $S_c(x_c, y_c, z_c)$ with respect to the coordinate system $S_b(x_b,y_b,z_b)$ of an imaginary crown gear in accordance with the present invention.

To generate the pinion and gear tooth surfaces, coordinate system $S_b(x_b, y_b, z_b)$ of the crown gear is rigidly connected to coordinate system $S_c(x_c, y_c, z_c)$. Coordinate system $S_b$ is installed with respect to $S_c$ as shown in FIG. 3, wherein a skew bevel gear is considered. In the case where a straight bevel gear is generated, parameters $\alpha$ and $\rho$ are equal to zero and coordinate system $S_b$ coincides with $S_c$.

Figure 4:
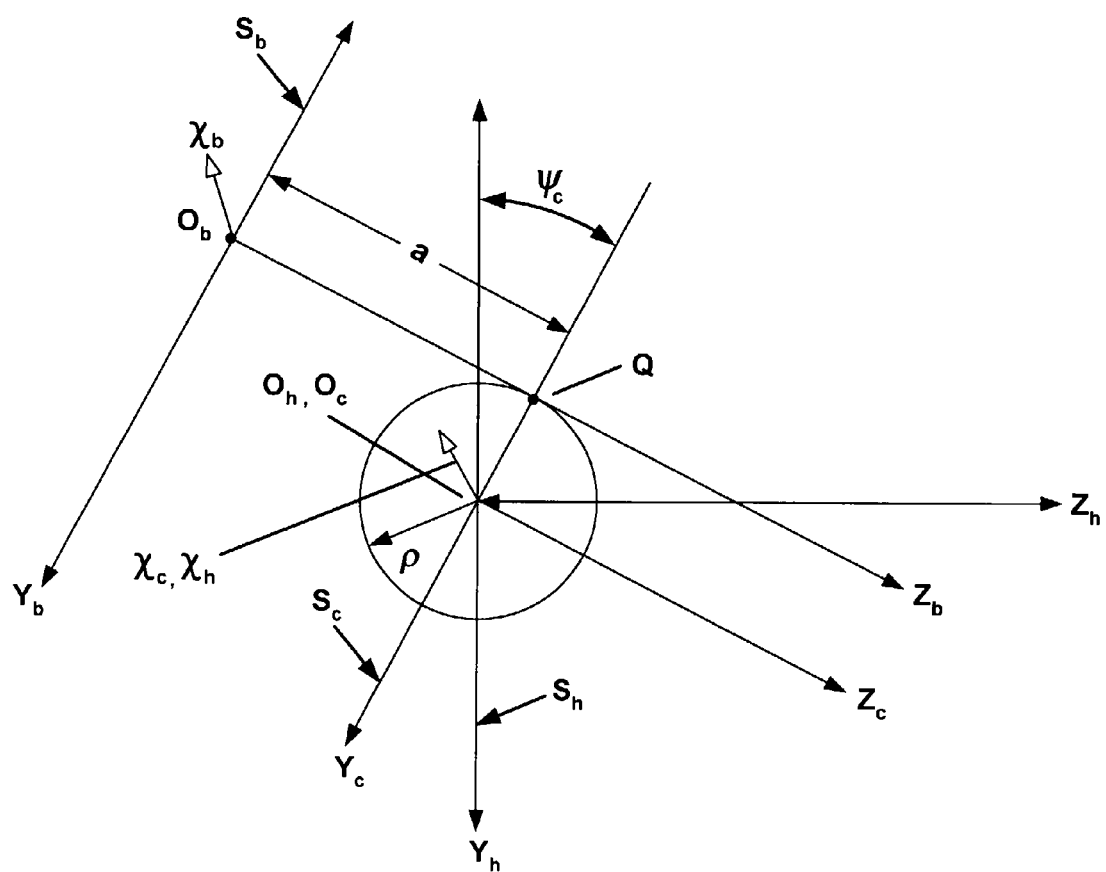
FIG. 4 shows the rotation of coordinate systems $S_b(x_b, y_b,z_b)$ and $S_c(x_c,y_c,z_c)$ of an imaginary crown gear with respect to a fixed coordinate system $S_h(x_h,y_h,z_h)$ in accordance with the present invention.

During the generation of pinion and gear tooth surfaces, the crown gear (with coordinate systems $S_c$ and $S_b$) rotates about axis $X_h$ of fixed coordinate system $S_h$ defined by axes $X_h$-$Y_h$-$Z_h$ as shown in FIG. 4. Angle $\psi_c$ represents the instantaneous angle of rotation of $S_c$ and of $S_b$ with respect to $S_h$ performed during generation. During rotation of the crown gear, axis $Z_b$ remains tangent to the circle of radius $\rho$ that is traced out by point Q of axis $Z_b$, as shown in FIGS. 3 and 4.

Figure 5:
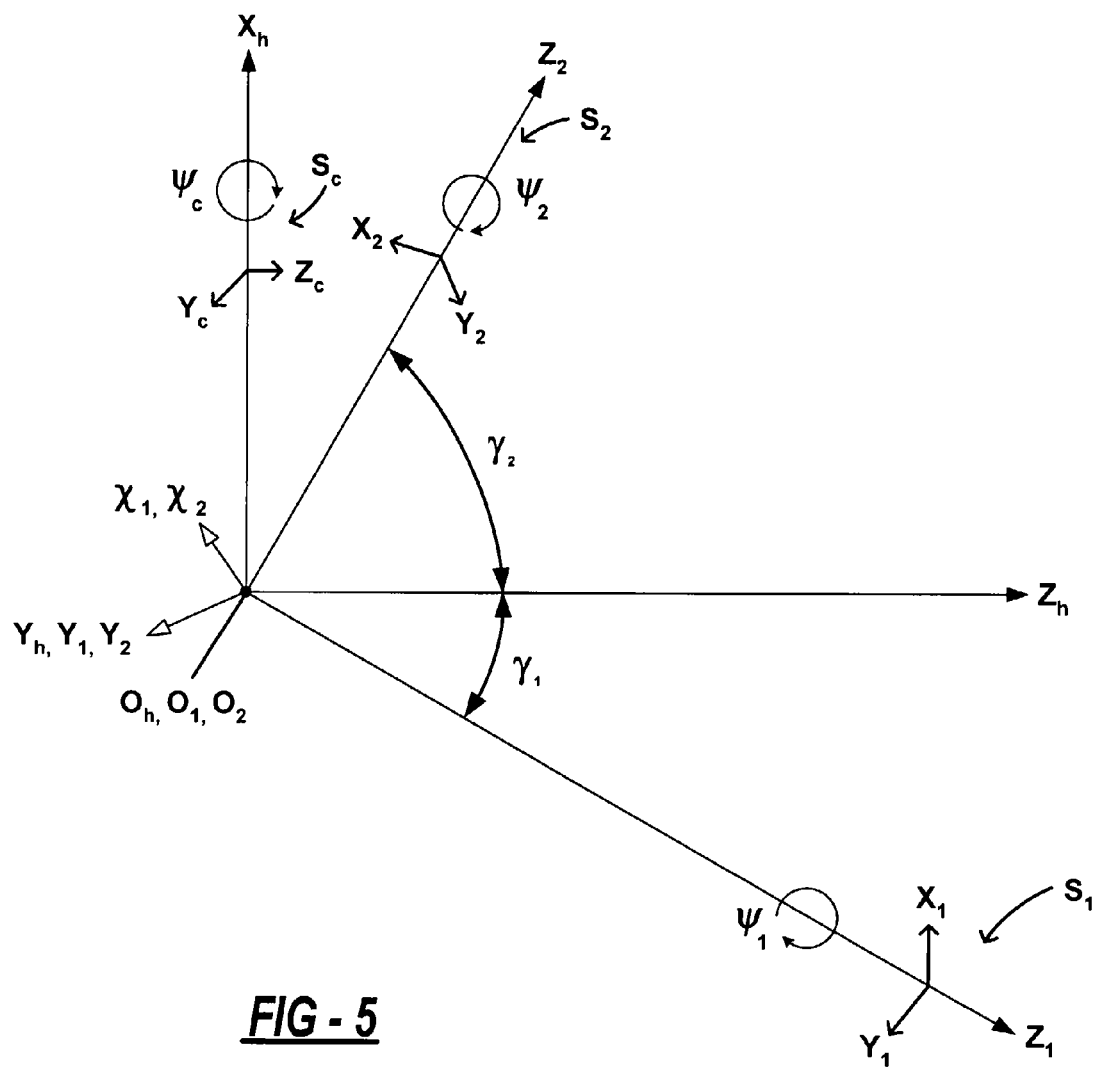
FIG. 5 shows the relative rotations of a pinion with coordinate system $S_1(x_1,y_1,z_1)$ and a gear with coordinate system $S_2(x_2,y_2,z_2)$ with respect to fixed coordinate system $S_h(x_h,y_h,z_h)$ in accordance with the present invention.

Simultaneously with rotation of the imaginary crown gear, the pinion and the gear perform related rotations about axes $Z_1$ and $Z_2$, as seen in FIG. 5. The pinion is represented in coordinate system $S_1$ defined by axes $X_1$-$Y_1$-$Z_1$, and the gear is represented in coordinate system $S_2$ defined by axes $X_2$-$Y_2$-$Z_2$. Arrows $\psi_c$, $\psi_1$, and $\psi_2$ in FIG. 5 illustrate rotations of the imaginary crown gear, pinion, and gear, respectively. Angles $\gamma_1$ and $\gamma_2$ represent angles of pitch cones of the pinion and gear.

During the process of the related rotations discussed above, the generating plane $\Sigma_b$ of the imaginary crown gear, shown in FIG. 2, generates a family of planes in coordinate systems $S_1$ and $S_2$, shown in FIG. 5, that are rigidly connected to the pinion and the gear. The tooth surfaces of the pinion and the gear are determined as the envelopes to the family of $\Sigma_b$ planes. See "Gear Geometry and Applied Theory," by F. L. Litvin, Prentice Hall, 1994. However, the envelopes are modified as will be explained below.

Figure 6:
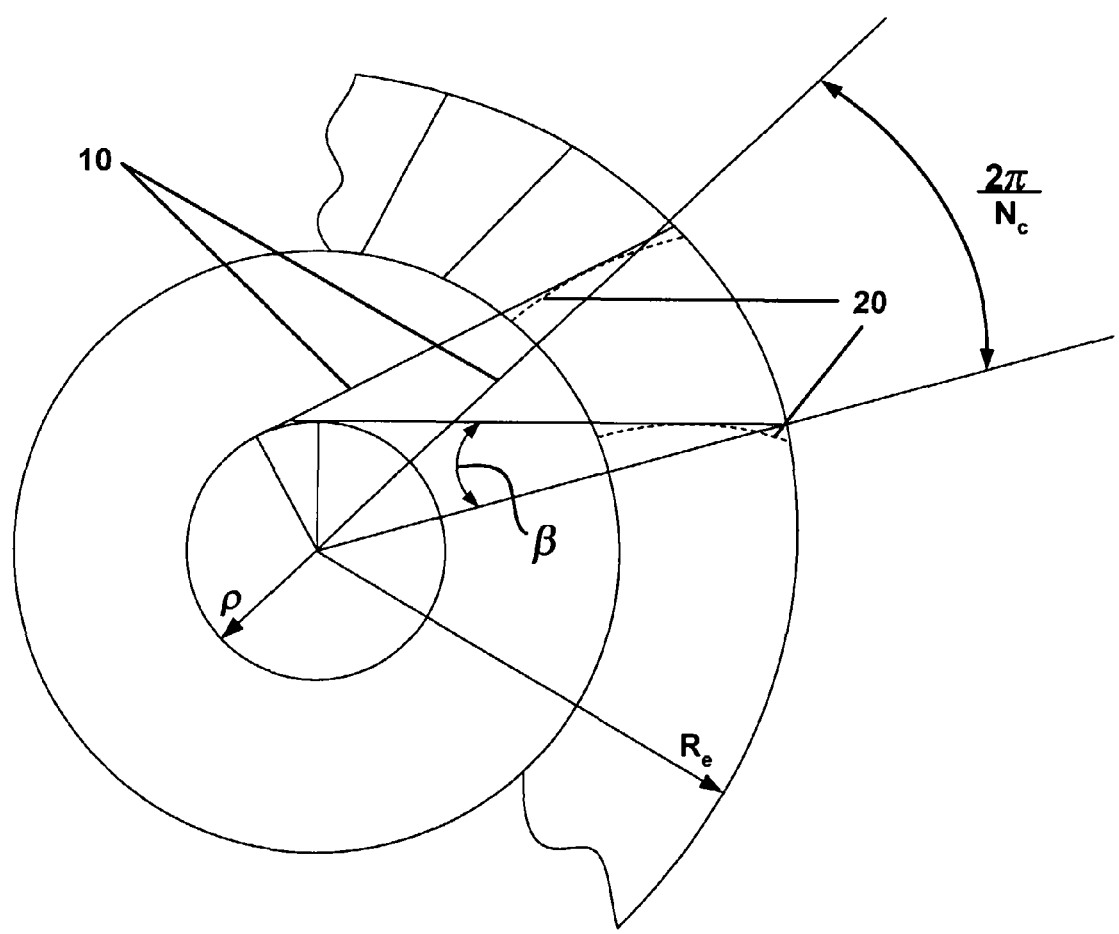
FIG. 6 shows a schematic of left-hand skew teeth in accordance with the present invention.
Figure 7:
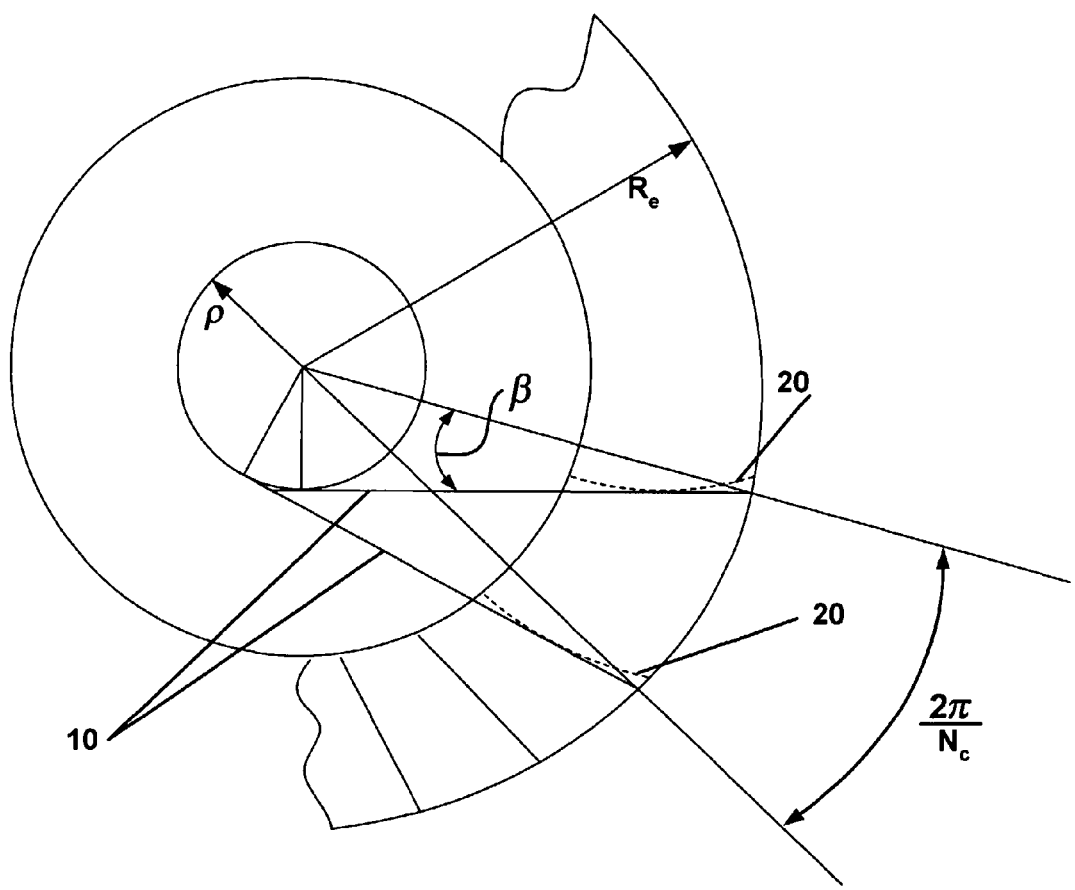
FIG. 7 shows a schematic of right-hand skew teeth in accordance with the present invention.

The installment of $S_b$ and $S_c$ with respect to $S_h$ determines the direction of the skew teeth. FIG. 6 illustrates teeth skewed in a left-hand direction while FIG. 7 illustrates teeth skewed in a right-hand direction. Linear skew teeth are designated by reference number 10 and illustrated with a solid line. Parabolic skew teeth generated by the method described by the present invention are designated by reference numeral 20 and are illustrated with a dashed line. The mean skew angle $\beta$ is determined as:

$$\sin \beta = \rho/R_e \quad (2)$$

wherein $R_e$ is the outer radius of the crown gear.

During the imaginary pinion and gear generation process, the pinion and gear are in line-contact with the imaginary crown gear. To achieve localization of the bearing contact, the line-contact along the tooth surfaces must be substituted by point contact. Two alternative methods for achieving point contact between the pinion and gear tooth surfaces are proposed.

Figure 8:
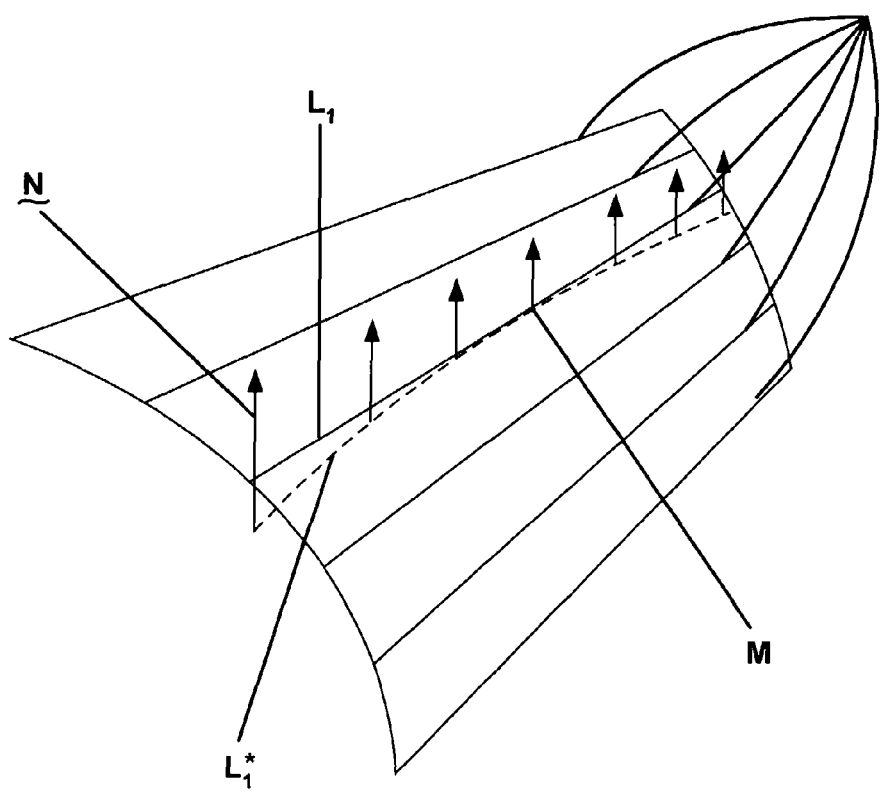
FIG. 8 shows the modification of theoretical lines of contact on a tooth surface in accordance with the present invention.
Figure 9:
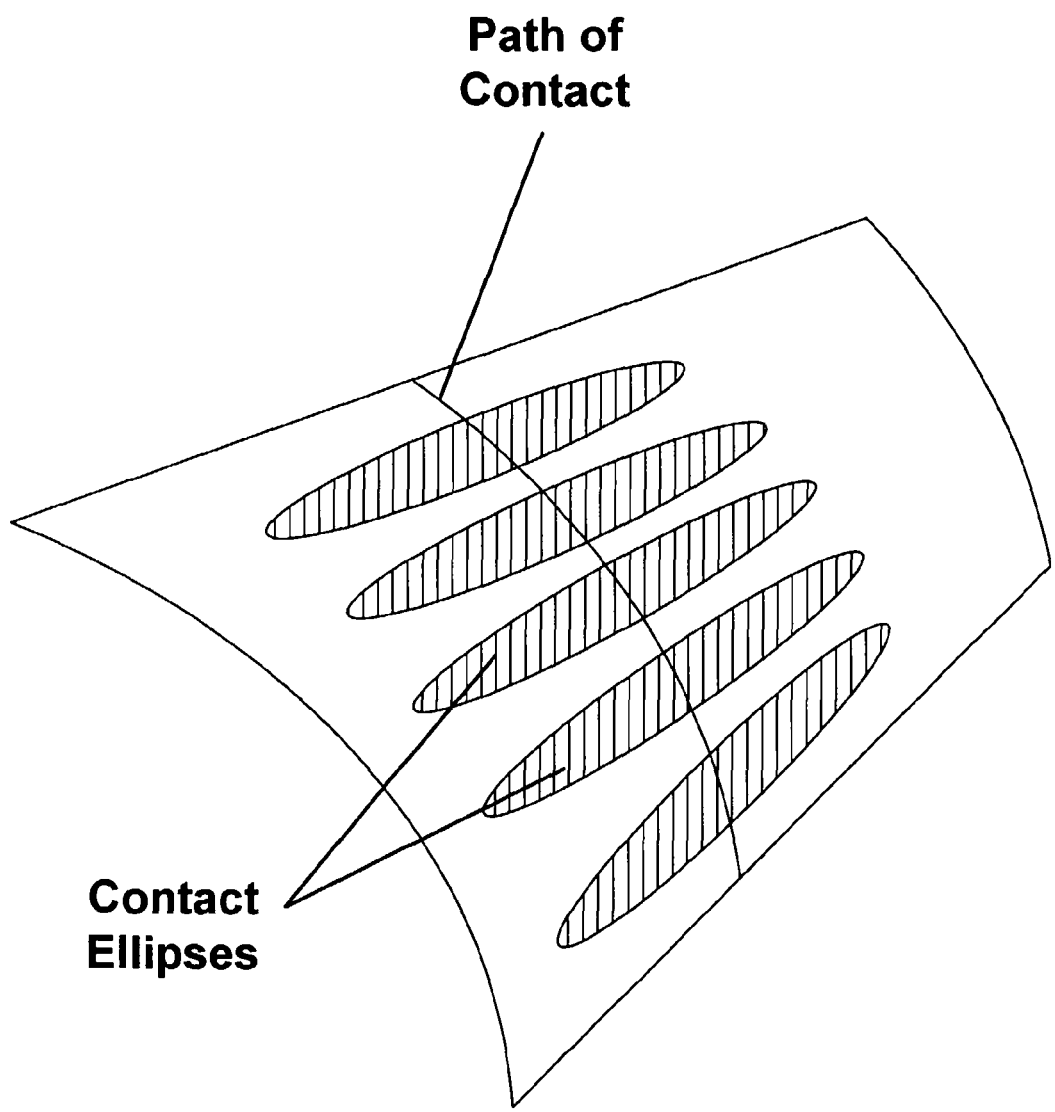
FIG. 9 shows the area of contact and path of contact on a tooth surface in accordance with the present invention.

In the first embodiment, shown in FIG. 8, the theoretical lines of contact on the tooth surface of the pinion and the gear are modified after generation of the tooth surfaces using the method described above. The family of theoretical lines of contact on the pinion or gear tooth surface is designated by $L_1$. The modified line is designated as $L_1^*$. The deviation of $L_1^*$ from $L_1$ satisfies the following conditions: the magnitude of deviation is determined by a parabolic function wherein the deviation at point M is equal to zero, and it is accomplished along normal N to the tooth surface. The deviation described above creates a path of contact on the mating tooth surfaces consisting of a locus of points M, located in the center of the tooth surfaces, wherein the deviation is equal to zero. The actual contact is spread at each point over an elliptical area centered around the locus of points M due to elastic deformation of the mating tooth surfaces, as shown in FIG. 9.

Figure 10:
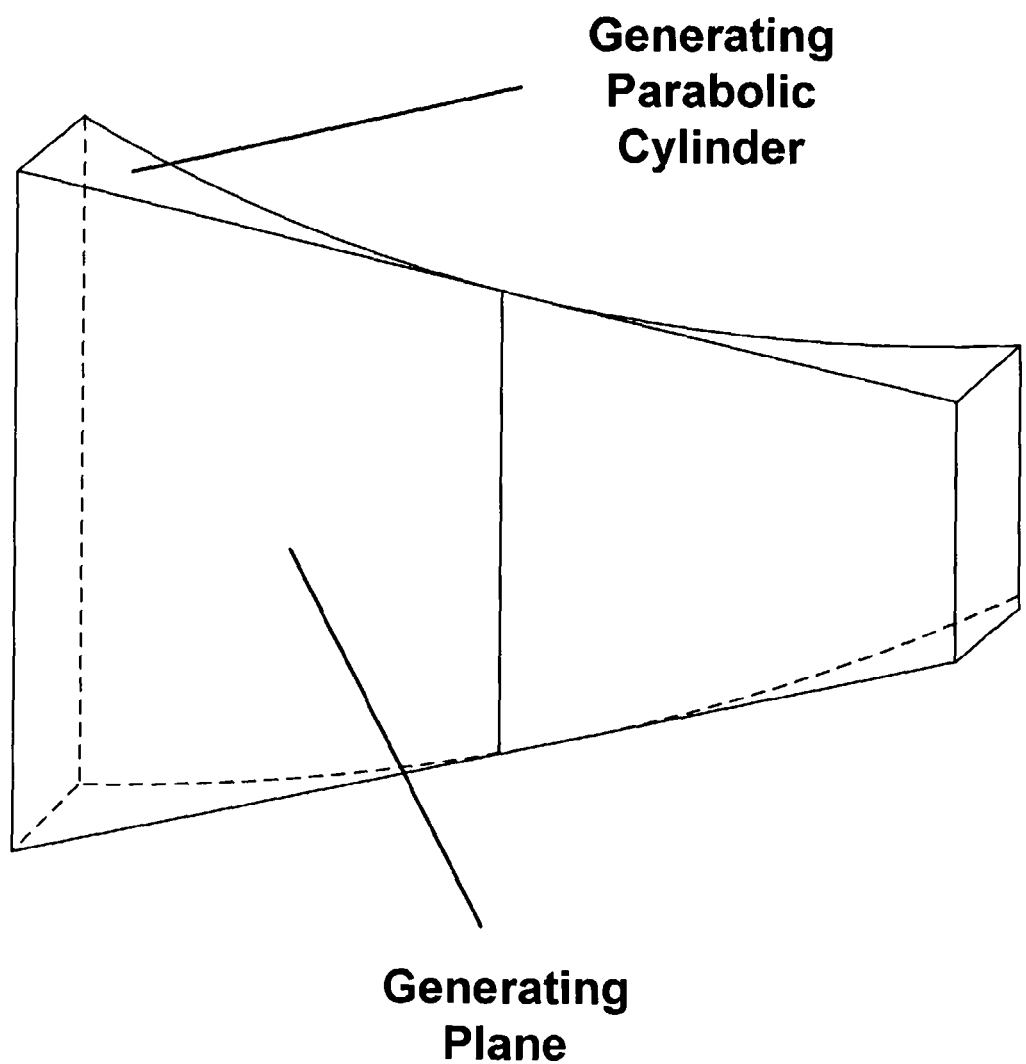
FIG. 10 shows a generating plane and a generating cylinder in accordance with the present invention.

In the second embodiment, localization of bearing contact is achieved using two crown gear generating surfaces that generate pinion and gear tooth surfaces separately. One of the generating surfaces is a plane and the other generating surface is a parabolic cylinder, as shown in FIG. 10. The two generating surfaces replace the generating surfaces $\Sigma_b$ and $\Sigma_b^*$ in FIGS. 2(a) and 2(b). The line of tangency of the parabolic cylinder and the plane is the path of contact on the generating surface. The gear and pinion are designed using the method described above wherein the generating parabolic cylinder generates, as it rotates, a parabolic tooth surface that localizes the bearing contact when the gear and pinion are meshed.

Figure 11:
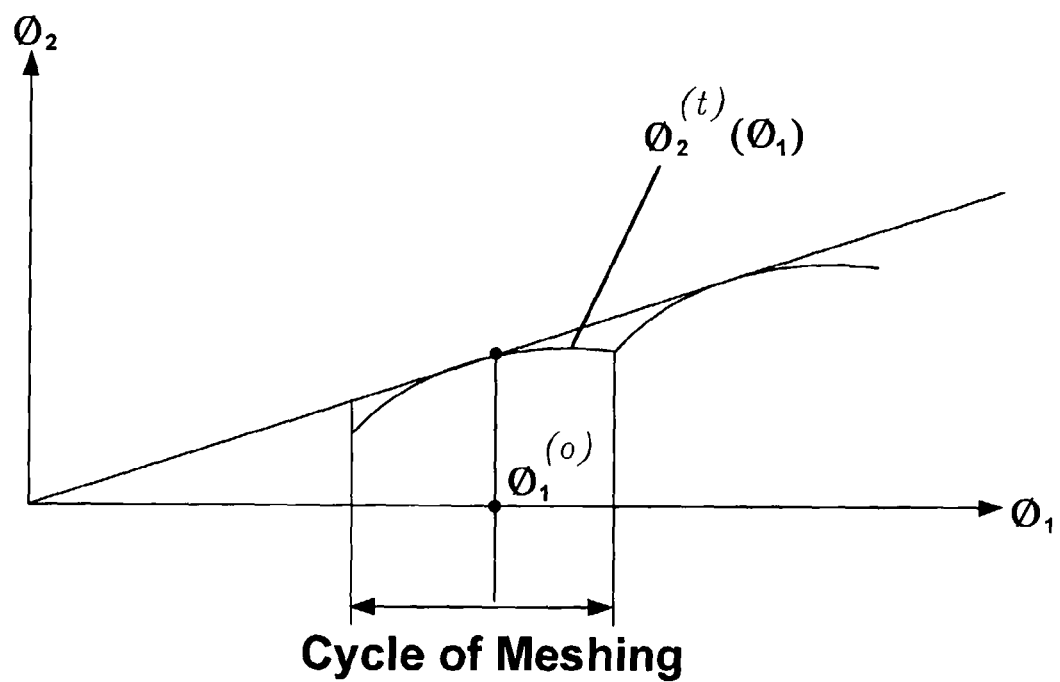
FIG. 11 is a graphical illustration of a transmission function $\phi_2(\phi_1)$, the transmission function is the sum of a linear function and a parabolic function of transmission errors predesigned for absorption of linear functions of transmission errors caused by misalignment of gears in accordance with the present invention.

This advanced geometry enables the use of a pre-designed parabolic function that absorbs linear functions of transmission errors caused by misalignment. This transmission function $\phi_2(\phi_1)$ is represented as the sum of a linear function and a parabolic function of transmission errors as graphically illustrated in FIG. 11. The transmission function $\phi_2(\phi_1)$ is designated by angles of rotation $\phi_1$ and $\phi_2$ generated during the process of meshing of the pinion and gear in the gear drive. However, angles of rotation $\phi_1$ and $\phi_2$ are different from angles of rotation $\psi_c$, $\psi_1$, and $\psi_2$ generated during the process of gear generation seen in FIG. 4 and FIG. 5.

During the generation process, the following relation is provided between angles of rotation $\psi_c$ of the crown gear and $\psi_2$ of the gear where k is the parabolic coefficient:

$$\psi_2(\psi_c) = (N_c/N_2)\psi_c - k(\psi_c)^2. \quad (3)$$

The angles of rotation of the pinion and the crown gear in the gear and pinion generation process are related according to the following equation:

$$\psi_1/\psi_c = N_c \sin \gamma_1/N_1. \quad (4)$$

The computerized simulation used by Applicants to generate the pinion and gear results in the following gear drive transmission function:

$$\phi_2(\phi_1) = (N_1/N_2)\phi_1 - k(\sin \gamma_1)^2(\phi_1)^2. \quad (5)$$

The above gear drive transmission function provides a parabolic function of transmission errors as follows:

$$\Delta\phi_2(\phi_1) = -k(\sin \gamma_1)^2(\phi_1)^2. \quad (6)$$

Application of the predesigned parabolic function of transmission errors allows for the absorption of linear functions of transmission errors caused by misalignment.

The surfaces of the pinion and gear are determined numerically as envelopes of the generating surfaces using approaches represented in differential geometry as well as in gear theory. See "Gear Geometry and Applied Theory," by F. L. Litvin, Prentice Hall (1994). For instance, the pinion tooth surface $\Sigma_1$ is determined as the envelope to the crown gear $\Sigma_c$ by the following equations:

$$r_1(u_c, \theta_c, \psi_c) = M_{1c}(\psi_c) r_c(u_c, \theta_c) \quad (7)$$

$$\left(\frac{\partial r_1}{\partial u_c} \times \frac{\partial r_1}{\partial \theta_c}\right) \cdot \frac{\partial r_1}{\partial \psi_c} = f_{c1}(u_c, \theta_c, \psi_c) = 0. \quad (8)$$

Here $r_c(u_c, \theta_c)$ is the vector equation that represents the generating surface $\Sigma_c$ of the crown gear; $(u_c, \theta_c)$ are the surface parameters of $\Sigma_c$; matrix $M_{1c}$ describes the coordinate transformation from coordinate system $S_c(x_c, y_c, z_c)$ rigidly connected to the crown gear to coordinate system $S_1(x_1, y_1, z_1)$ rigidly connected to the pinion; $\psi_c$ is the generalized parameter of motion that defines angles of rotation of the crown gear and the pinion; vector function $r_1(u_c, \phi_c, \psi_c)$ defines the family of generating surfaces $\Sigma_c$ in coordinate system $S_1$. Above equation (8) is the equation of meshing $f_{c1}=0$. Above equations (7) and (8) determine pinion tooth surface $\Sigma_1$ by three related parameters. The tooth surfaces $\Sigma_2$ of the gear are determined similarly.

The pinion and gear tooth surfaces $\Sigma_1$ and $\Sigma_2$ formed as discussed above are made as exact copies of respective dies. The dies are generated point by point using a Computer Numerically Controlled (CNC) machine. The pinion and gear with the desired surface characteristics are made from dies which are an exact copy of their respective surfaces. A metal or other suitable material is then placed into the die and allowed to cool, forging a bevel gear with the proposed geometry of the present invention. The result is a pinion and gear with teeth having curved surfaces. The curved surfaces of the pinion teeth are tangent to the curved surfaces of the gear teeth such that interaction between teeth occurs substantially at a common point of each curved mating tooth surface.

Figure 12A:
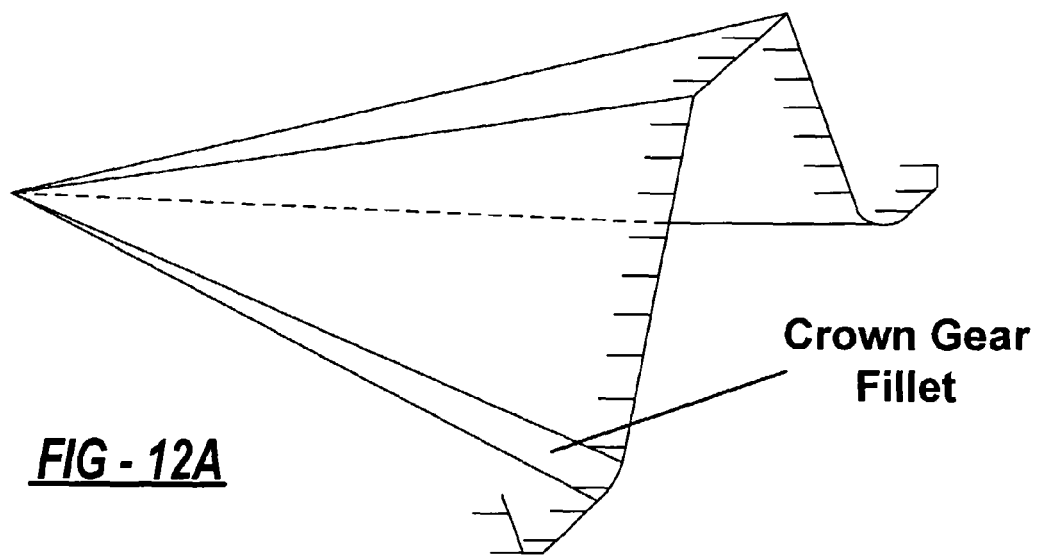
FIG. 12 shows a crown gear fillet in accordance with the present invention.
Figure 12B:
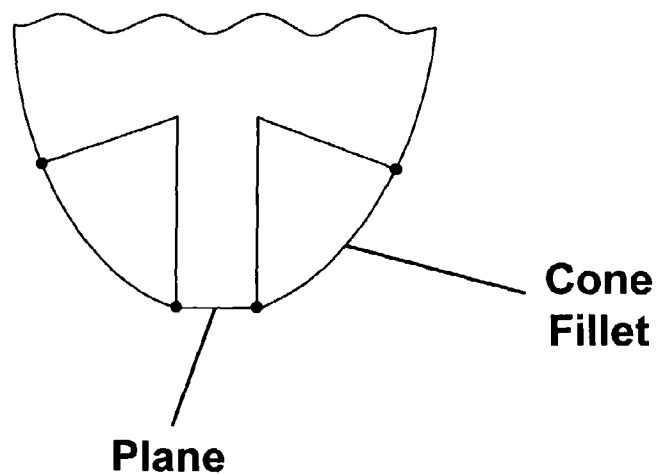

The gear and pinion may also contain a fillet. The fillet of the gear or pinion is generated by the fillet of the crown gear which is illustrated in FIG. 12(a). The crown gear fillet is formed by two cones and a plane (FIG. 2(b)). However, in some cases the crown gear fillet may be formed by one cone. The fillet of the pinion (or the gear) is generated as the envelope to the fillet of the generating crowning gear.

In view of the foregoing disclosure, those of ordinary skill in the art will appreciate that the disclosure provides a first method that includes: forming a first line of contact by meshing an imaginary crown gear with a first model bevel gear, the imaginary crown gear including a first imaginary tooth surface, the first model bevel gear having a first model tooth surface; employing a first parabolic function to determine a magnitude of a first deviation from the first line of contact, wherein the first deviation is taken in a direction that is normal to a point at which the imaginary tooth surface and the first model tooth surface are tangent; generating a first gear model based on the first model bevel gear, the first line of contact and the first deviation; forming a first forging die based on the first gear model; and forging a first bevel gear with the first forging die.

The first method can further comprise: forming a second forging die based on a second gear model; forging a second bevel gear with the second forging die; and meshing the first bevel gear with the second bevel gear, wherein each of the first and second bevel gears includes a plurality of teeth and wherein meshing of the first and second bevel gears entails substantially point contact between the teeth of the first bevel gear and the teeth of the second bevel gear. In one form, each of the teeth of the first and second bevel gears can include a tooth flank wherein contact between one of the tooth flanks of the first bevel gear and one of the tooth flanks of the second bevel gear occurs substantially within a center portion of each tooth flank. In another form, point contact between the teeth of the first bevel gear and the teeth of the second bevel gear can occur in a contact area that is generally elliptical in shape.

The first method can further comprise: forming a second line of contact by meshing the imaginary crown gear with a second model bevel gear, the second model bevel gear having a second model tooth surface; employing a second parabolic function to determine a magnitude of a second deviation from the second line of contact, wherein the second deviation is taken in a direction that is normal to a point at which the imaginary tooth surface and the second model tooth surface are tangent; and generating the second gear model based on the second model bevel gear, the second line of contact and the second deviation.

Those of ordinary skill in the art will also appreciate that the disclosure provides a second method that includes: forming an imaginary crown gear having a first generating surface and a second generating surface, the first generating surface being contained in a flat plane, the second generating surface that is defined by a parabolic cylinder; rotating the imaginary crown gear to form a first bevel gear model; forming a first forging die based on the first bevel gear model; and forging a first bevel gear with the first forging die.

The second method can further include: forming a second forging die based on a second bevel gear model; forging a second bevel gear with the second forging die; and meshing the first bevel gear with the second bevel gear, wherein each of the first and second bevel gears includes a plurality of teeth and wherein meshing of the first and second bevel gears entails substantially point contact between the teeth of the first bevel gear and the teeth of the second bevel gear. In one form, each of the teeth of the first and second bevel gears can include a tooth flank and wherein contact between one of the tooth flanks of the first bevel gear and one of the tooth flanks of the second bevel gear can occur substantially within a center portion of each tooth flank. Point contact between the teeth of the first bevel gear and the teeth of the second bevel gear can occur in a contact area that can be generally elliptical in shape.

The second method can further include: rotating the imaginary crown gear to form the second bevel gear model.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method comprising:
   forging a gear having a plurality of finished gear teeth;
   forging a pinion having a plurality of finished pinion teeth;
   meshing the finished gear teeth with the finished pinion teeth, wherein meshing of the finished gear teeth and the finished pinion teeth entails substantially point contact between the finished gear teeth and the finished pinion teeth and is accompanied by a parabolic function of transmission errors; and
   calculating a transmission error using an algebraic sum of a linear function and a parabolic function that relates angles of rotation of the gear and the pinion with an imaginary crown gear.

2. The method of claim 1, wherein the transmission error is calculated according to the formula:

$$e_t = -k(\sin \gamma_1)^2 (\phi_1)^2$$

wherein $e_t$ is the transmission error, k is a parabolic coefficient, $\gamma_1$ is a pitch cone angle of the pinion and $\phi_1$ is an angle of rotation of the pinion.

3. A method comprising:
   forming a bevel gear and a bevel pinion, the bevel gear including a plurality of gear teeth and the bevel pinion including a plurality of pinion teeth, the bevel gear and the bevel pinion being formed such that when meshed together a transmission error is calculated according to the formula:

$$e_t = -k(\sin \gamma_1)^2 (\phi_1)^2$$

wherein $e_t$ is the transmission error, k is a parabolic coefficient, $\gamma_1$ is a pitch cone angle of the pinion and $\phi_1$ is an angle of rotation of the pinion and wherein at least one of the gear teeth and the pinion teeth is formed in a forging operation.

* * * * *